Patented Jan. 24, 1939

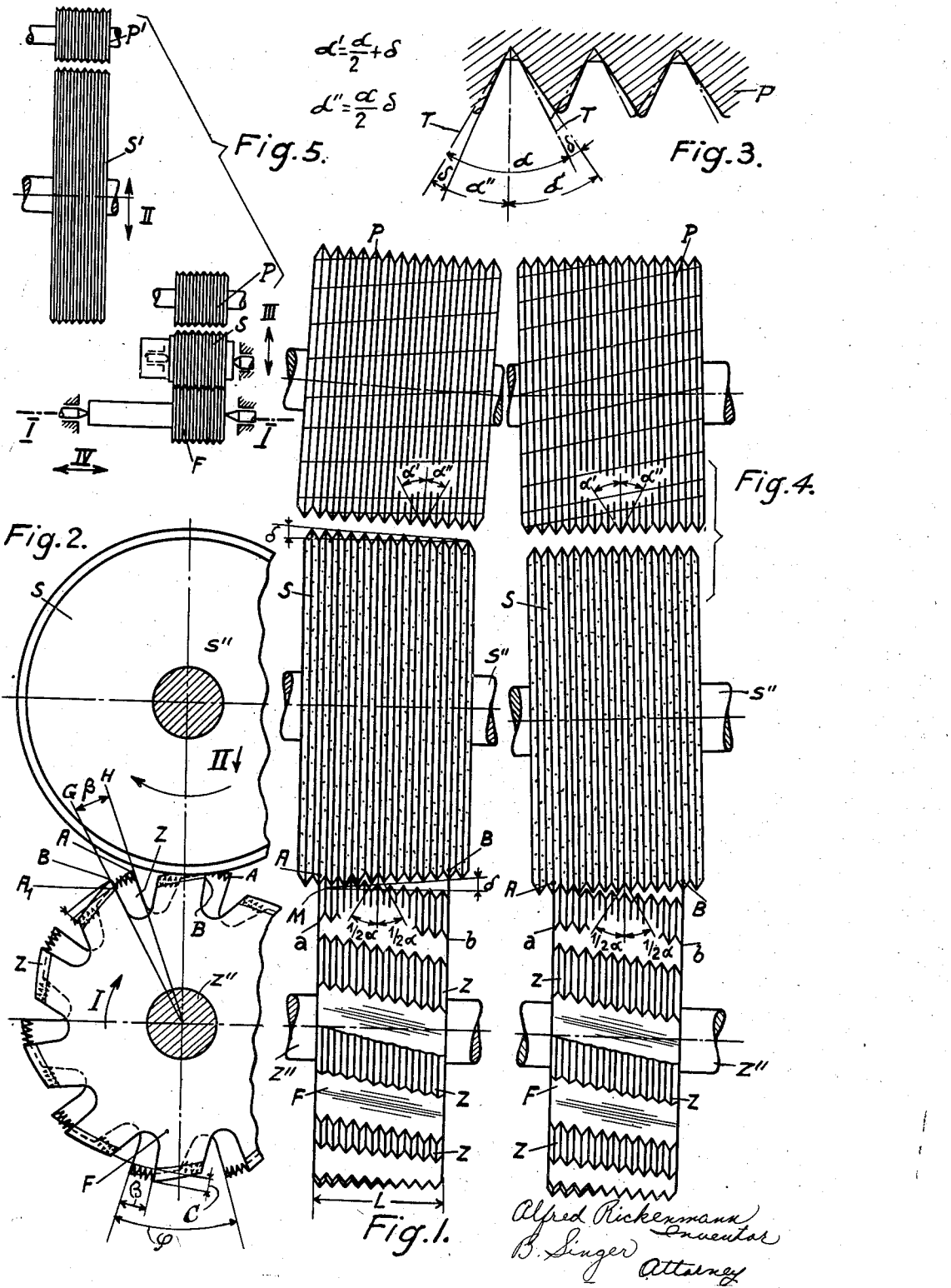

2,145,202

UNITED STATES PATENT OFFICE 2,145,202

METHOD AND DEVICE FOR RELIEVING SPIRALLY GROOVED SCREW GROOVE MILLING TOOLS

Alfred Rickenmann, Zurich, Switzerland, assignor to Reishauer Tool Works, Limited, Zurich, Switzerland, a corporation of Switzerland Application September 13, 1937, Serial No. 163,671

2 Claims. (Cl. 51—283)

It is already well known to relieve spirally grooved screw groove milling tools in connection with which there serve as grinding tool separate grinding discs which only operate on one screw profile and wherein each profile division must be further divided. It is also known to relieve screw groove milling tools by means of multigrooved grinding discs in connection with which, however, the spiral tooth shape was omitted and only straight grooved milling tools were produced.

The method set out hereinafter enables spirally grooved groove milling tools to be relieved by means of wide grooved discs in a single operation so that the dividing between the separate profile grooves is omitted.

It is known in practice that spirally grooved milling tools are considerably superior to straight grooved milling tools in their efficiency. By the use of wide multigrooved grinding discs there is obtained a considerably higher accuracy in division and in addition the time necessary for grinding is reduced very considerably. The new method therefore constitutes a substantial technical advance.

Examples of the new method are hereinafter described with reference to the accompanying drawing.

Fig. 1 is an elevation of a spirally grooved milling tool, the grinding disc therefor and the grinding-disc sharpening pressure roller, showing their relative position in the grinding machine.

Fig. 2 is a side elevation of the milling tool and the grinding disc.

Fig. 3 is a detail view hereinafter referred to.

Fig. 4 is a view similar to Fig. 1, but showing a modification.

Fig. 5 is a diagrammatic elevational view of another modification.

The milling cutter F comprises a plurality of teeth Z. The ratio of the useful tooth length to the tooth pitch is so dimensioned that the grinding disc S can sufficiently relieve one tooth Z without damaging the cutting edge of the next adjacent tooth Z. This requirement necessitates the use of comparatively small grinding disc diameters.

The relieving is effected in the known manner by means of a grinding machine of any suitable and known construction having a relieving cam to feed the grinding disk S on to the cutter F. It is immaterial whether the grinding disc or the work carries out the relieving movement. Machines of this type are well known and therefore are not shown in the drawing.

The relieving of the milling tool F is effected when the axes of the grinding disc S and that of the milling tool F are parallel. The length of the grinding disk S exceeds the length of the milling cutter F. To relieve the teeth Z of the milling tool F the threads A to B of the relieving grinding disk S have to enter the grooves between the threads M to N of the milling tool F. To relieve a tooth Z the grinding disk S has to be advanced towards the tool F while the tool F turns in the direction of arrow I. The axis S″ is advanced towards axis Z″ for a certain predetermined amount which may be equal to c, while the tool F turns about an angle equal to φ. The tool F is spirally grooved; therefore the threads M to N will pass one by one the line S″Z″ and one groove after the other will enter in contact with the disk S and be worked on by the threads A to B. The last thread B enters the last groove after the grinding disk S has been advanced towards the tool F by the amount c. If the tool F is to retain its cylindrical shape, the grinding disk has to be of conical shape. The conicity of the disk S is a function of the angle β. If β denotes the angle enclosed by the radii G and H and φ the pitch angle, c the amount of radial advance of disk S towards tool F and L the length of a tooth Z, then $$tg\delta = \frac{\beta}{\varphi} \cdot \frac{c}{L}$$

Although the disk S is conical the threads A to B have to take the position as if cut on a cylindrical tool as the said threads have to conform the grooves M to N on the cylindrical tool F.

In order that the screw profile on the work F is at right angles to the axis thereof it is also necessary with the conical grinding disc S for the screw profile to be at right angles to the grinding disc axis.

The production of the grinding discs is effected in the known manner by means of pressure rollers P whilst the grinding disc profile is produced by pressing the roller at low disc revolutions. In order to enable a direct rolling to be obtained it is necessary to set the axis of the cylindrical pressure roller P parallel to the circumference of the grinding disc S. The axes of the grinding disc S and the pressure roller P are therefore not parallel. As already mentioned the screw profile of the grinding disc S must be at right angles to the axis thereof, consequently the profile on the pressure roller P must be inclined to the axis of the pressure roller P. Assume a line (R) at right angles to the axis V—V of the press roller P, the angle of the groove to be α and the axis V—V running parallel to the mantle lines of the disk S. The theoretical profile that is the one which would be cut on a cylindrical roller P is shown by the broken lines T—T (see Fig. 3). To obtain the correct shape of the threads A to B a correction is to be given. The angle $\alpha''$ equals $$\alpha''=\frac{\alpha}{2}-\delta \text{ and } \alpha'=\frac{\alpha}{2}+\delta$$

As a departure from the above described method it is also possible to imagine the use of cylindrical grinding discs, instead of conical grinding discs S, whilst then it is true the grinding must not take place in a parallel position of the axes of the milling tool and of the grinding disc. The axes must be located at a predetermined angle to one another. The determination of this angle is effected in the same way as the determination of the above mentioned conicity. In this case the thread profile of the grinding disc S must then be suitably inclined so that the work F is correct, the two half flank angles $\alpha'$ and $\alpha''$ being determined as indicated above. By this method the rolling of the disc profile may be effected when the axes of the grinding disc and pressure roller are in a parallel position. (Fig. 4.) The question whether the grinding is to be effected with a conical disc S and parallel position of the axes or with a cylindrical disc S and inclined axes is of secondary importance for the result and depends mainly on the construction of the machine used.

As already mentioned comparatively small grinding discs are necessary for relieving these milling tools. As small grinding discs are naturally subjected to more rapid wear than grinding discs of large diameter the preliminary grinding is preferably effected with a grinding disc S' of large diameter and the finished grinding with a small grinding disc. With the large disc (see Fig. 5) S' the preliminary grinding is effected only with such a large relieving eccentricity as is allowable without damaging the next succeeding teeth Z, whereupon the small finishing grinding disc S has only to carry out the complete relieving.

The large grinding disc S' with corresponding pressure roller P' and the small grinding disc S with pressure roller P are each mounted on a slide which is movable to and fro at right angles to the milling axis I—I (Fig. 5) in the direction of the arrows II, III.

The work F is shiftable transversely on a slide in the direction of the arrow IV, so that it can be brought into position with respect to one or other grinding disc S, S' without it being necessary to reclamp it.

I declare that what I claim is:—

1. The method of relieving spirally grooved screw grooved milling tools, which consists in selecting a conical grinding tool of a length at least as long as the milling tool to be ground, and having profile grooves which are at right angles to the axis of the grinding tool and whose conicity is determined according to the magnitude of the angle between the radii through the entering points at the opposite sides of the milling tool and according to the magnitude of the relieving, and feeding said grinding tool to the work bodily in a direction normal to the axis of the work until relieving has been completed, while holding the grinding tool and the milling tool against relative movement along their respective axes and while rotating the grinding tool and the milling tool on their respective axes in opposite directions, whereby the grinding tool first contacts the milling tool at one side of each peripheral face segment of the milling tool and then progressively contacts said segment along the length of the same parallel to the axis of the tool as such segment passes a plane in which the axes of the milling tool and the grinding tool lie.

2. The method of relieving spirally grooved screw grooved milling tools having alternately disposed peripheral working faces separated by grooves which extend lengthwise of the tool and at angles to the direction of the axis of the tool, said method comprising selecting a multi-grooved grinding tool of a length at least that of said milling tool, and feeding said grinding tool to the milling tool solely by a relative movement in a direction normal to the axis of the milling tool, and rotating said milling tool and said tool on their respective axes in a direction opposite each other, while holding the grinding and the milling tools in such positions that the portion of the surface of the grinding tool which lies adjacent the milling tool is arranged to define an acute angle with the adjacent face of the milling tool in a plane containing the axes of the tools so that the leading edge of a peripheral working segment will engage with the grinding tool at one side thereof and progressively along said edge to the other side as said edge progresses through a plane containing the axes of both the grinding tool and the milling tool.

ALFRED RICKENMANN.